US012698303B2

(12) United States Patent
O'Nolan et al.

(10) Patent No.: US 12,698,303 B2
(45) Date of Patent: Aug. 4, 2026

(54) METHOD FOR THE CAPTURE OF CARBON DIOXIDE USING OXYFLUORIDE PHYSISORBENTS

(71) Applicant: RESEARCH TRIANGLE INSTITUTE, Research Triangle Park, NC (US)

(72) Inventors: Daniel O'Nolan, Chapel Hill, NC (US); Mustapha Soukri, Cary, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 414 days.

(21) Appl. No.: 18/205,314

(22) Filed: Jun. 2, 2023

(65) Prior Publication Data

US 2024/0400597 A1 Dec. 5, 2024

(51) Int. Cl.
C07F 15/04 (2006.01)
B01D 53/04 (2006.01)
B01D 53/047 (2006.01)

(52) U.S. Cl.
CPC .......... C07F 15/04 (2013.01); B01D 53/0462 (2013.01); B01D 53/0476 (2013.01); *B01D 2253/204* (2013.01); *B01D 2257/504* (2013.01)

(58) Field of Classification Search
CPC ...... C07F 15/04; C07F 15/045; C07F 19/005; B01D 53/0462; B01D 53/0476; B01D 2253/204; B01D 2257/504; B01D 53/02; B01D 53/047; B01D 53/04; Y02C 20/40; B01J 20/226; B01J 20/3483
See application file for complete search history.

(56) References Cited

U.S. PATENT DOCUMENTS

2015/0158013 A1 6/2015 Eddaoudi et al.
2020/0114301 A1 4/2020 Cadiau et al.

FOREIGN PATENT DOCUMENTS

WO WO-2021186073 A1 * 9/2021 .......... B01J 20/3078

OTHER PUBLICATIONS

Xie et al., "Optimal Binding Affinity for Sieving Separation of Propylene from Propane in an Oxyfluoride Anion-Based Metal-Organic Framework". J. Am. Chem. Soc., 145, 2386-2394 (published Jan. 24, 2023).*
Bhatt, P.M. et al., "A Fine-Tuned Fluorinated MOF Addresses the Needs for Trace CO2 Removal and Air Capture Using Physisorption," J. Am. Chem. Soc., 2016, 138, 9301-9307.
Heier, K.R. et al., "The Polar [WO2F4]2—Anion in the Solid State," Inorg. Chem. 1999, 38, 762-767.

(Continued)

*Primary Examiner* — Daniel Berns
*Assistant Examiner* — Joshua Maxwell Speer
(74) *Attorney, Agent, or Firm* — Jenkins, Taylor & Hunt, P.A.

(57) ABSTRACT

Metal-organic frameworks (MOFs) comprising square arrays of nickel cationic centers linked by N-donor organic ligands and pillared with tungsten oxyfluoride anion are described. In an exemplary MOF, the N-donor organic ligands are pyrazine and the MOF has a pore size of less than about 7 angstroms. Methods of using the MOF to selectively capture carbon dioxide, e.g., from gas compositions comprising nitrogen and/or methane, are also described.

14 Claims, 13 Drawing Sheets
(13 of 13 Drawing Sheet(s) Filed in Color)

(56)                  References Cited

OTHER PUBLICATIONS

Iacomi, P. et al., "pyGAPS: a Python-based framework for adsorption isotherm processing and material characterization," Adsorption, 2019, 25, 1533-1542.

Kumar, A. et al., "Hybrid ultramicroporous materials (HUMs) with enhanced stability and trace carbon capture performance," Chem. Commun. 2017, 53, 5946-5949.

Myers, A.L. et al. "Thermodynamics of mixed-gas adsorption," AIChE Journal, 1965, 11(1), 121-127.

* cited by examiner

METHOD FOR THE CAPTURE OF CARBON DIOXIDE USING OXYFLUORIDE PHYSISORBENTS

GOVERNMENT INTEREST

This invention was made with government support under DE-FE0031954 awarded by the U.S. Department of Energy. The government has certain rights in the invention.

TECHNICAL FIELD

The presently disclosed subject matter relates to a porous physisorbent comprising a metal-organic framework (MOF) comprising nickel cations coordinated by nitrogen donor-containing organic ligands (e.g., pyrazine) and pillared with tungsten oxyfluoride $(WO_2F_4)^{2-}$ anions. The presently disclosed subject matter also relates to methods of carbon dioxide $(CO_2)$ capture, e.g., from air, flue gas, and natural gas, using the MOF.

BACKGROUND

To limit global warming, there is significant interest in reducing carbon emissions from developed nations. Decarbonization efforts have primarily focused on industrial point sources. However, the removal of the already present low partial pressure of $CO_2$ in the air of about 400 parts-per-million (ppm) remains challenging. Removal of atmospheric $CO_2$ by direct air capture (DAC) is a promising technology, offering equitable and mobile emission mitigation. Yet, cost remains a barrier to DAC.

Accordingly, there is an ongoing need for additional, preferably low cost, materials for $CO_2$ capture, such as materials with high $CO_2$ swing capacity, kinetics, and selectivity.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a metal-organic framework (MOF) comprising a plurality of molecular building units having the formula $[Ni(L)_2(WO_2F_4)]$, wherein each L is a bidentate organic ligand comprising two N-donor functional groups. In some embodiments, each L comprises one or more N-containing heterocyclic groups. In some embodiments, each L is pyrazine and the MOF comprises a plurality of molecular building units having the formula $[Ni(pyrazine)_2(WO_2F_4)]$.

In some embodiments, the presently disclosed subject matter provides a method of removing carbon dioxide $(CO_2)$ from a fluid, the method comprising: (a) providing a metal-organic framework (MOF), the MOF comprising a plurality of molecular building units having the formula $[Ni(L)_2(WO_2F_4)]$, wherein each L is a bidentate organic ligand comprising two N-donor functional groups; (b) contacting the MOF with a fluid composition comprising $CO_2$ and one or more other chemical species; and (c) selectively capturing the $CO_2$ from the fluid composition. In some embodiments, the MOF comprises a plurality of molecular building units having the formula $[Ni(pyrazine)_2(WO_2F_4)]$.

In some embodiments, the one or more other chemical species comprise nitrogen $(N_2)$, water $(H_2O)$, oxygen $(O_2)$ and/or methane $(CH_4)$. In some embodiments, the fluid is a gas comprising about 50% by volume $CO_2$ or less. In some embodiments, the fluid is a gas comprising about 15% by volume $CO_2$ or less. In some embodiments, the fluid is a gas comprising about 4% by volume $CO_2$ or less. In some embodiments, the fluid is air comprising about 400 ppm $CO_2$. In some embodiments, capturing the $CO_2$ occurs selectively over one or more of $H_2O$, $N_2$, $O_2$, and $CH_4$.

In some embodiments, the MOF is regenerated after step (c) via heating and reused to capture additional $CO_2$. In some embodiments, the MOF is regenerated after step (c) via vacuum and reused to capture additional $CO_2$. In some embodiments, the MOF is regenerated after step (c) via vacuum and heating and reused to capture additional $CO_2$.

Accordingly, it is an object of the presently disclosed subject matter to provide a metal-organic framework (MOF) comprising a plurality of molecular building units having the formula $[Ni(L)_2(WO_2F_4)]$, e.g., $[Ni(pyrazine)_2(WO_2F_4)]$, and to related methods of capturing $CO_2$.

Certain objects of the presently disclosed subject matter having been stated hereinabove, which are addressed in whole or in part by the presently disclosed subject matter, other objects and aspects will become evident as the description proceeds when taken in connection with the accompanying Examples as best described herein below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The presently disclosed subject matter can be better understood by referring to the following figures. The components in the figures are not necessarily to scale, emphasis instead being placed upon illustrating the principles of the presently disclosed subject matter. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the below drawings.

Figure 1C:
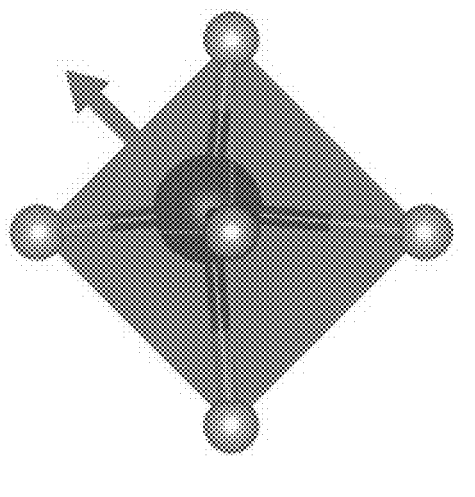
Figure 1B:
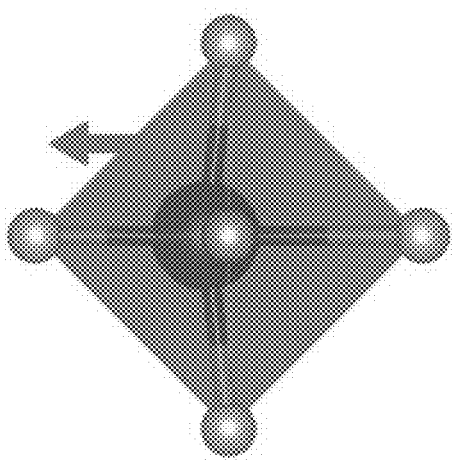
Figure 1A:
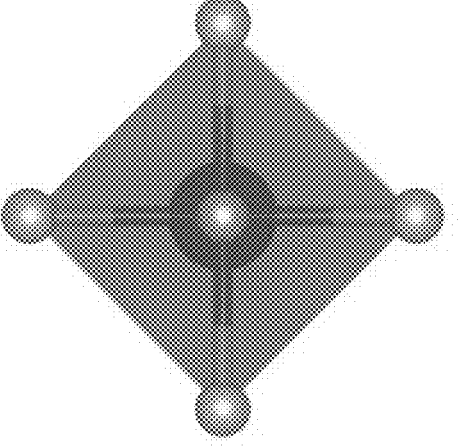

FIG. 1A is a schematic drawing showing an undistorted coordination polyhedron of a metal hexafluoride $(MF_6^{2-})$ anion.

FIG. 1B is a schematic drawing showing distortion of the coordination polyhedron of FIG. 1A when one of the fluoride ligands is replaced by an oxygen atom, resulting in a shorter M=O bond.

FIG. 1C is a schematic drawing showing distortion of the coordination polyhedron of FIG. 1A when two of the fluoride ligands are replaced by oxygen atoms, resulting in shorter M=O bonds, in the $MO_2F_4^{2-}$ coordination complex.

Figure 2:
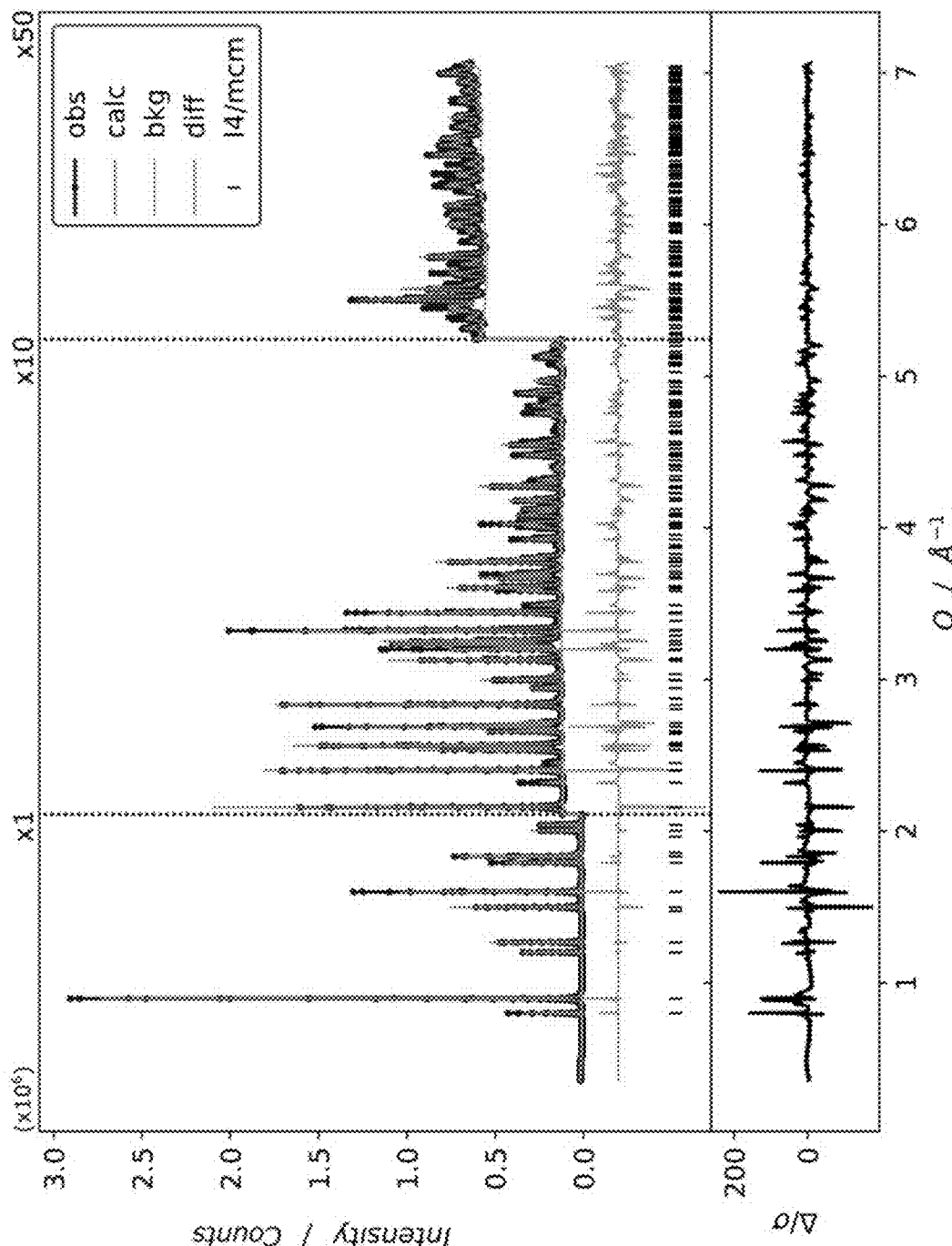

FIG. 2 is a graph showing the X-ray powder diffraction (XRPD) patterns of a porous physisorbent comprising an exemplary metal-organic framework (MOF) comprising nickel cations linked by pyrazine and tungsten dioxyfluoride anions. Obs=observed; calc=calculated; bkg=background; diff=difference.

Figure 3B:
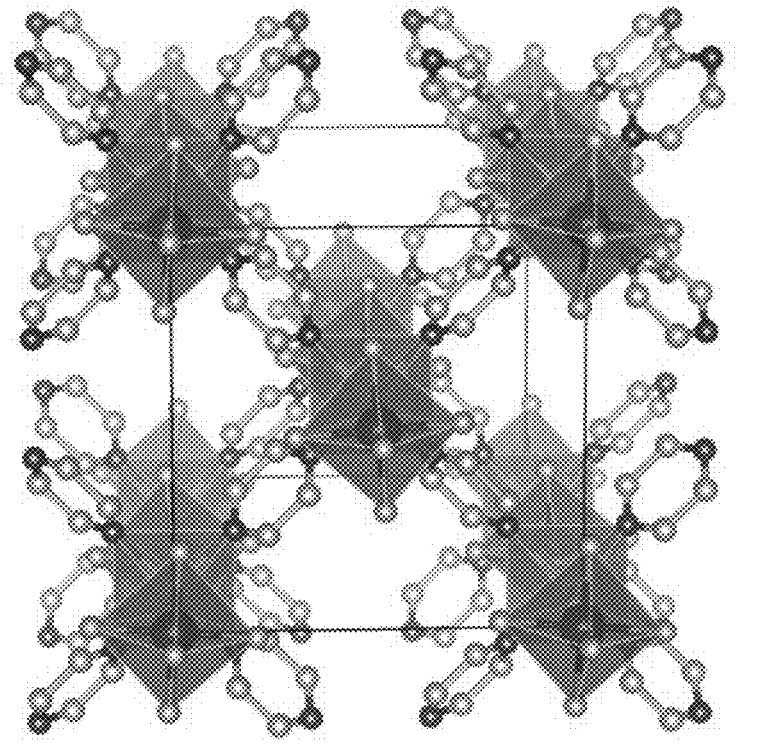
Figure 3A:
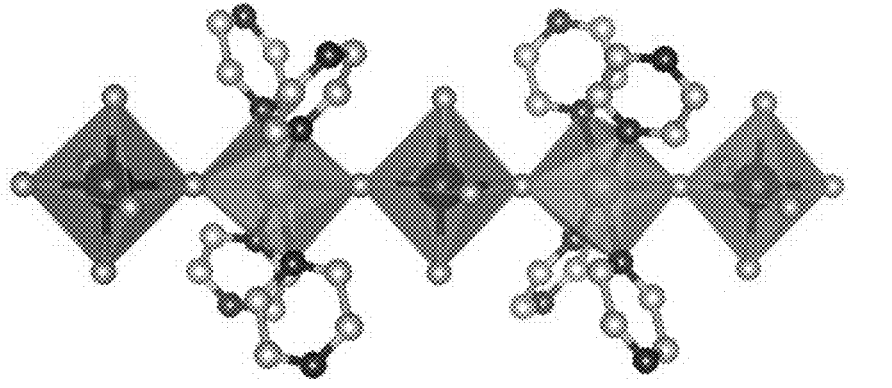

FIG. 3A is a schematic drawing showing nickel (Ni) centers complexed to pyrazine ligands and sandwiched between tungsten dioxyfluoride anion $[Ni(WO_2F_4)]_2$ pillars.

FIG. 3B is a schematic drawing showing a primitive cubic (pcu) network formed by pyrazine crosslinking of multiples structures from FIG. 3A.

Figure 4:
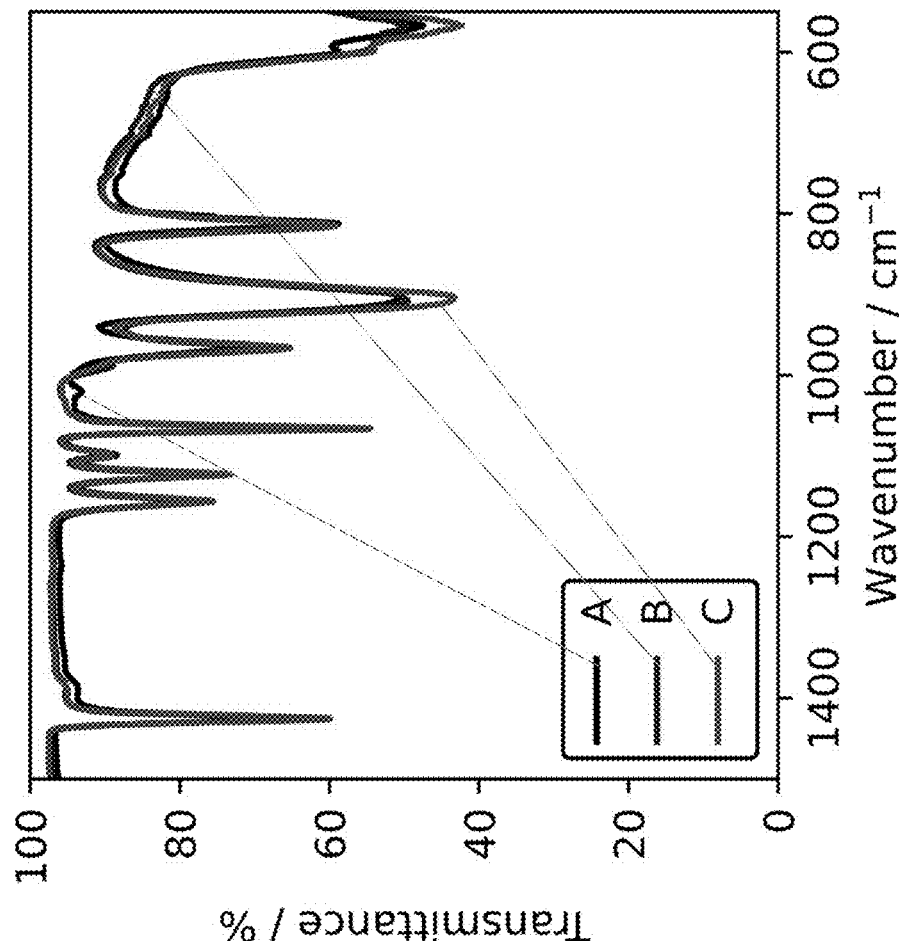

FIG. 4 is a graph showing the Fourier transform infrared (FTIR) spectra (transmittance (as a percent (%)) versus wavenumber (in inverse centimeters ($cm^{-1}$))) of different batches (A, B, and C) of an exemplary nickel-tungsten physisorbent of the presently disclosed subject matter (i.e., $WO_2F_4$-1-Ni).

Figure 5B:
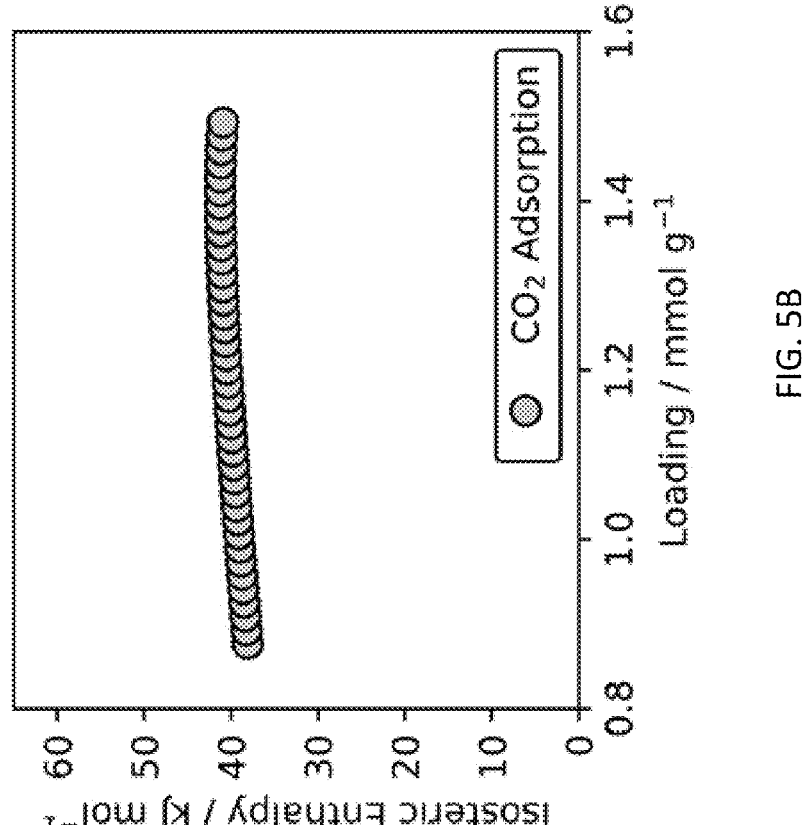
Figure 5A:
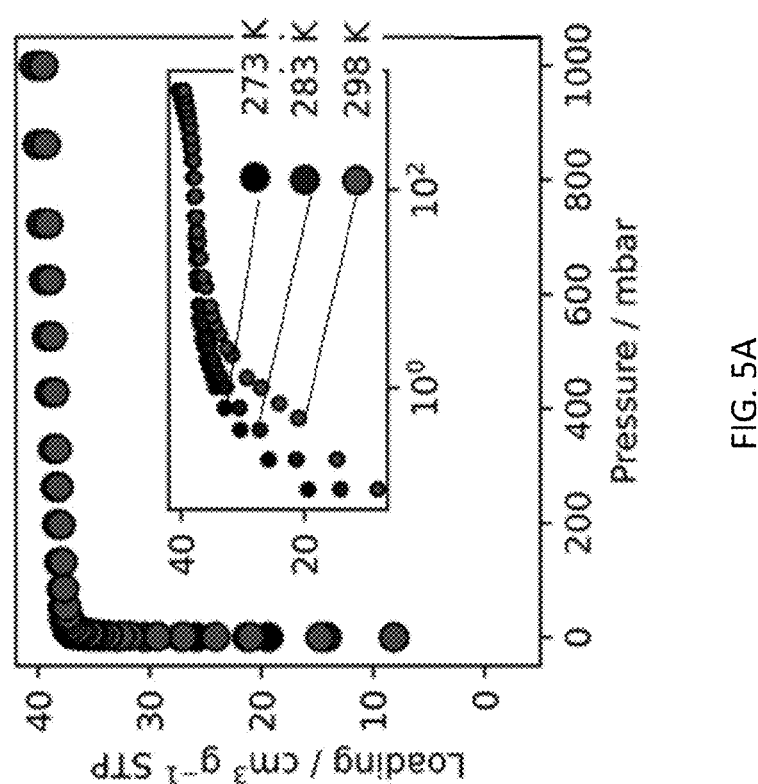

FIG. 5A is a graph showing the carbon dioxide ($CO_2$) adsorption isotherms (loading in cubic centimeters per gram at standard temperature and pressure ($cm^3$ $g^{-1}$ STP) for an exemplary nickel-tungsten physisorbent of the presently disclosed subject matter (i.e., $WO_2F_4$-1-Ni) at different temperatures (273 Kelvin (K), 283 K, and 298 K). The inset shows the adsorption isotherms in log-scale.

FIG. 5B is a graph showing the isosteric enthalpy of carbon dioxide ($CO_2$) adsorption (isosteric enthalpy (in kilojoules per mole (kJ $mol^{-1}$) versus loading (in millimoles per gram (mmol $g^{-1}$) of an exemplary nickel-tungsten physisorbent of the presently disclosed subject matter (i.e., $WO_2F_4$-1-Ni).

Figure 6A:
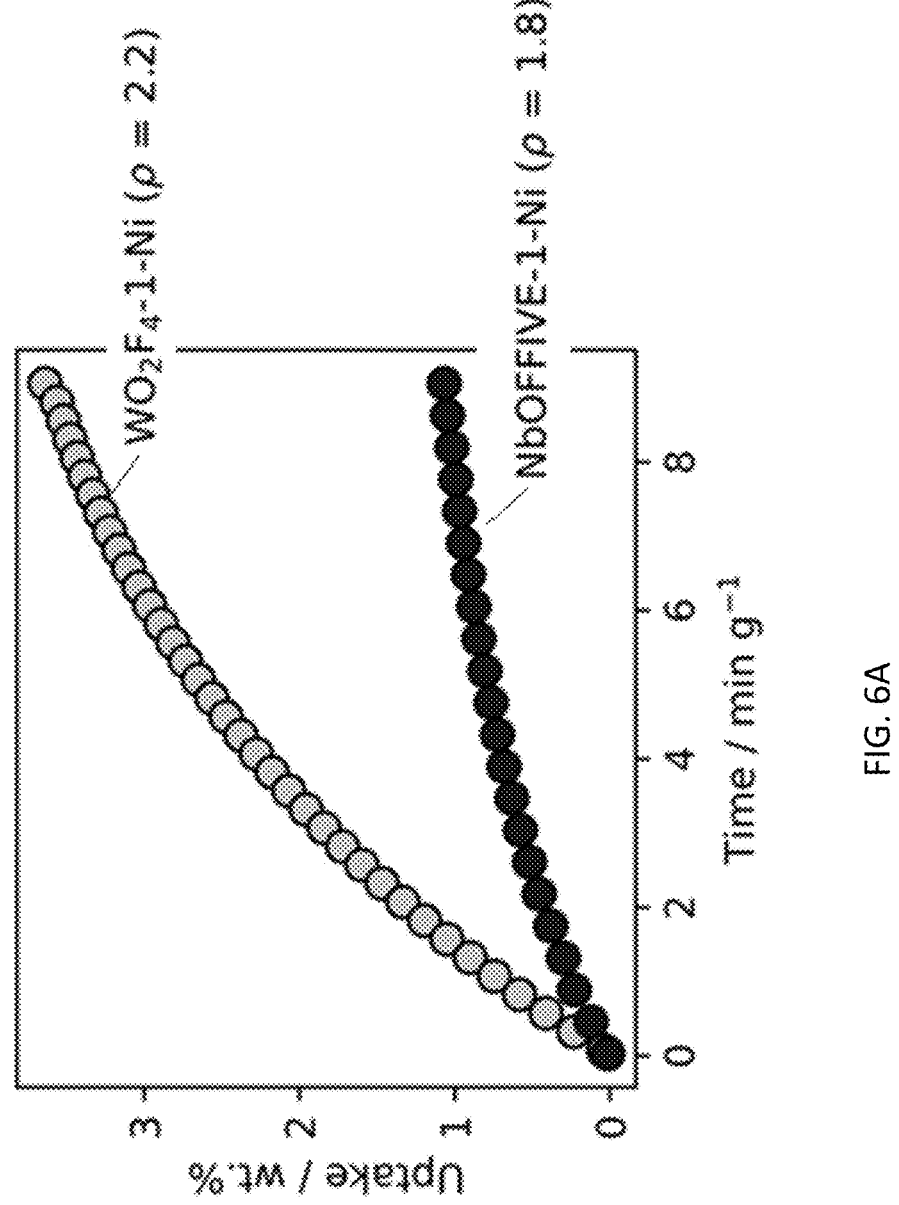

FIG. 6A is a graph showing the time-resolved adsorption profiles (uptake (in weight % (wt. %)) versus time (in minutes per gram (min $g^{-1}$))) for an exemplary nickel-tungsten physisorbent of the presently disclosed subject matter (i.e., $WO_2F_4$-1-Ni) and for an isostructural material comprising niobium oxyfluoride anions (NbOFFIVE-1-Ni).

Figure 6B:
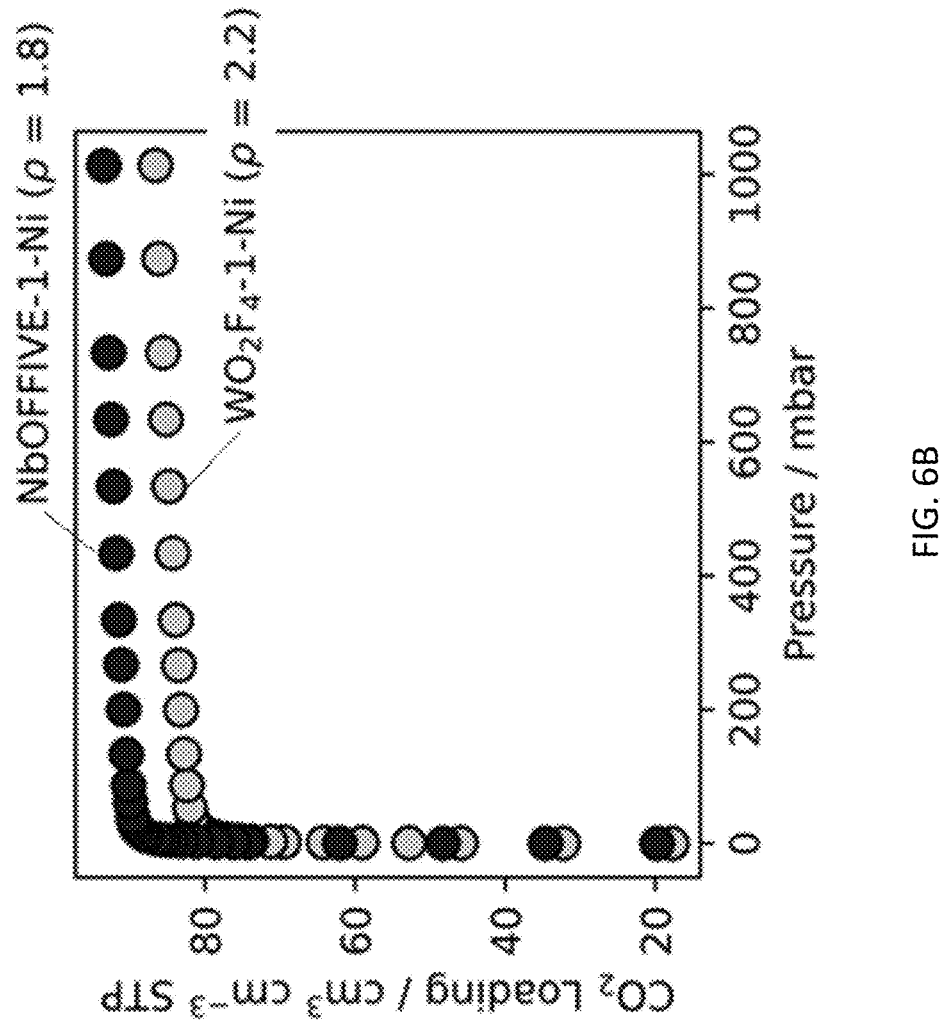

FIG. 6B is a graph showing a comparison of volumetric carbon dioxide ($CO_2$) capacity ($CO_2$ loading versus pressure (in millibar (mbar))) for an exemplary nickel-tungsten physisorbent of the presently disclosed subject matter (i.e., $WO_2F_4$-1-Ni) and for an isostructural material comprising niobium oxyfluoride anions (NbOFFIVE-1-Ni).

Figure 7B:
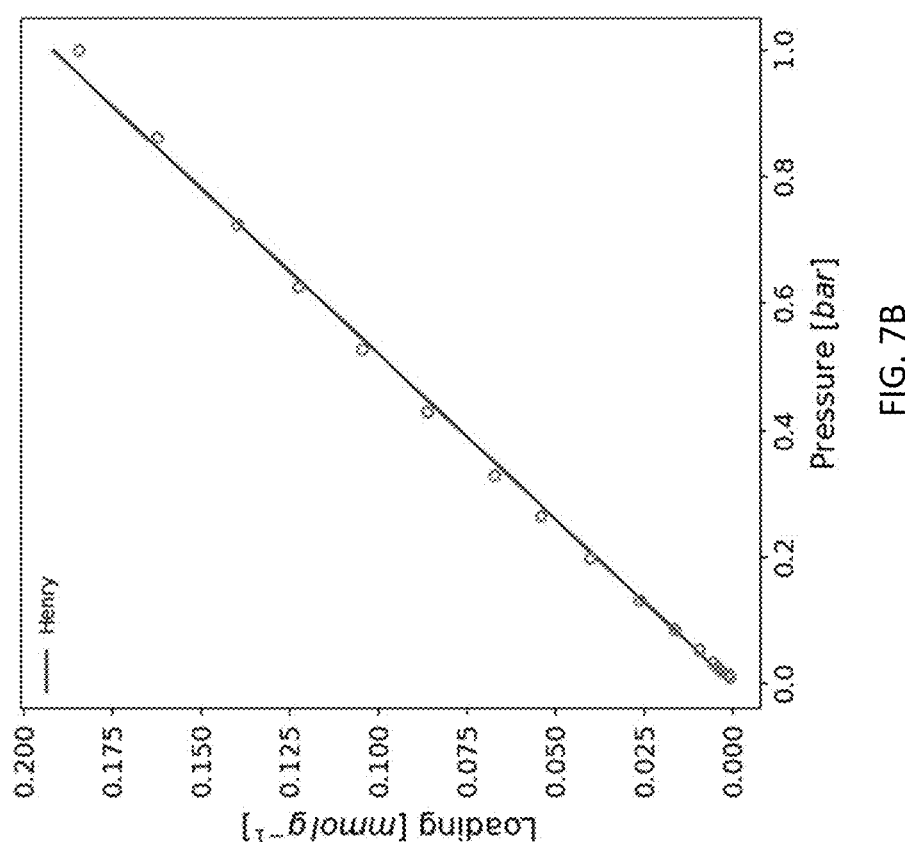
Figure 7A:
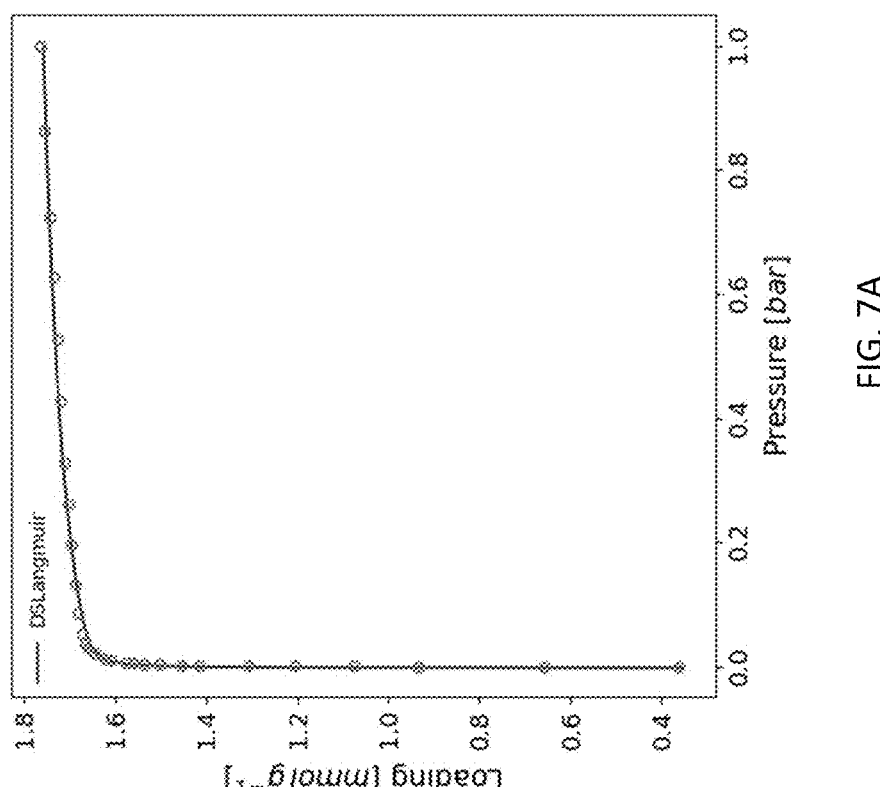

FIG. 7A is a graph showing the dual-site Langmuir (DSL) fitting to the 298 Kelvin (K) carbon dioxide ($CO_2$) adsorption isotherm (loading (in millimoles per gram (mmol $g^{-1}$) versus pressure (in bar)) of an exemplary nickel-tungsten physisorbent of the presently disclosed subject matter (i.e., $WO_2F_4$-1-Ni). Root means square error (RMSE)=0.01844.

FIG. 7B is a graph showing the Henry fitting to the 298 Kelvin (K) nitrogen ($N_2$) adsorption isotherm (loading (in millimoles per gram (mmol $g^{-1}$) versus pressure (in bar)) of an exemplary nickel-tungsten physisorbent of the presently disclosed subject matter (i.e., $WO_2F_4$-1-Ni). Root means square error (RMSE)=0.00192.

Figure 7C:
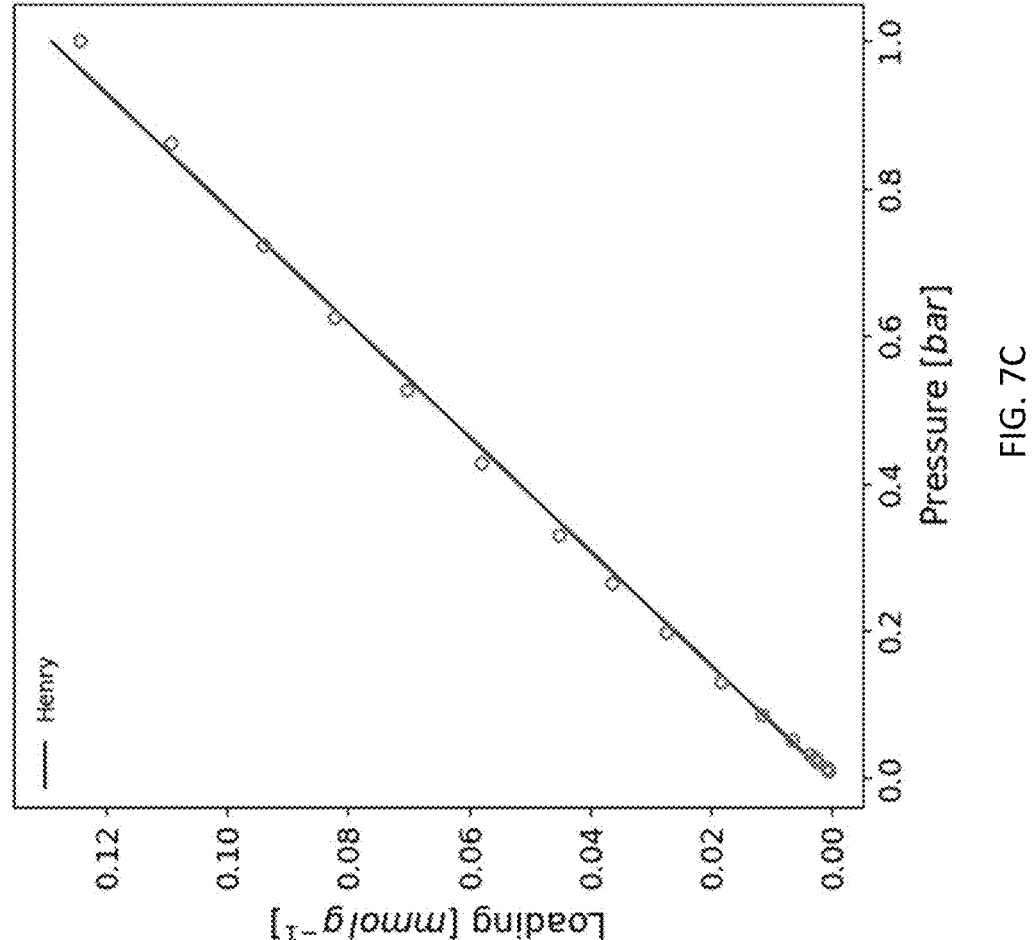

FIG. 7C is a graph showing the Henry fitting to the 298 Kelvin (K) methane ($CH_4$) adsorption isotherm (loading (in millimoles per gram (mmol $g^{-1}$) versus pressure (in bar)) of the presently disclosed nickel-tungsten physisorbent ($WO_2F_4$-1-Ni). Root means square error (RMSE)=0.00291.

Figure 8B:
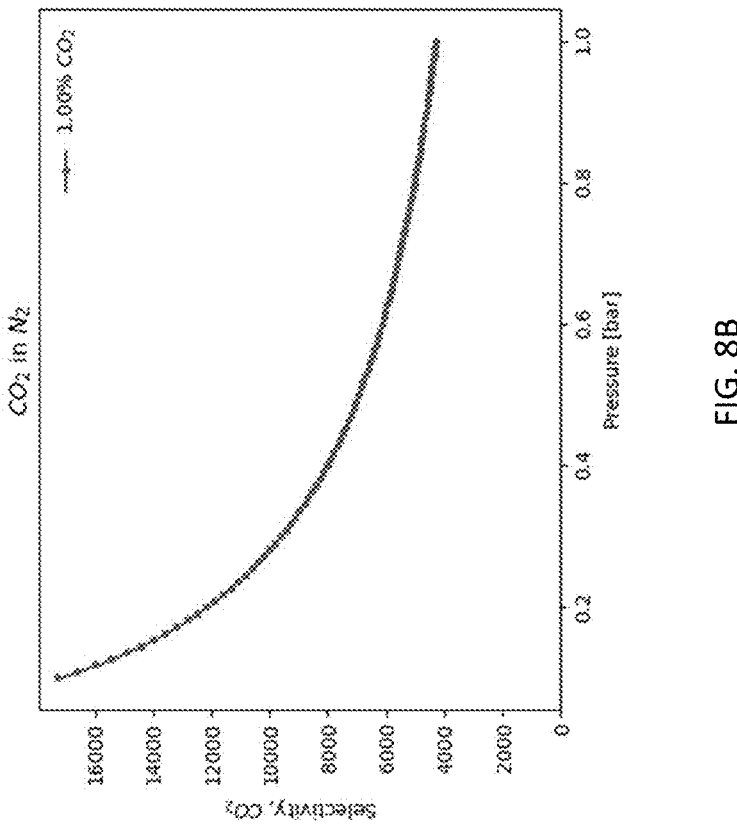
Figure 8A:
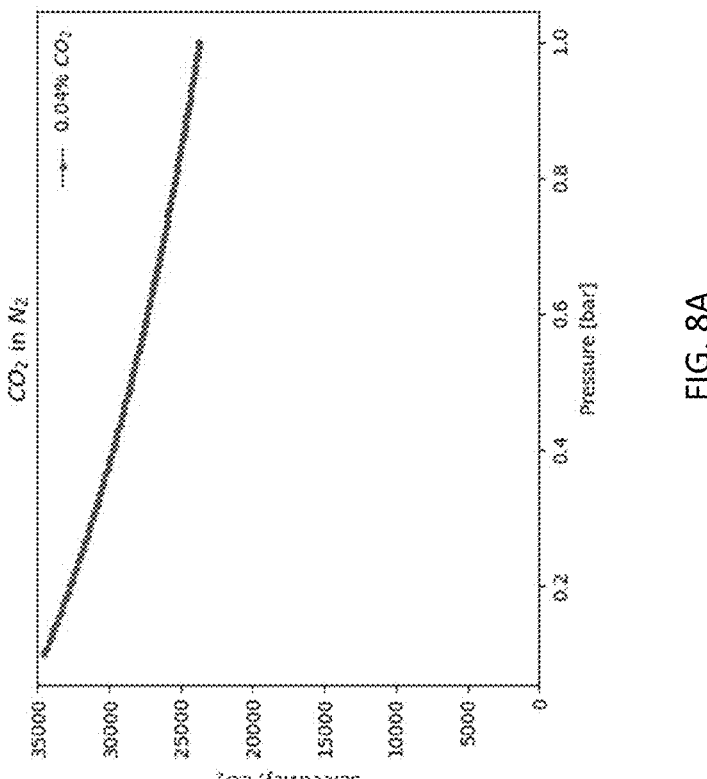

FIG. 8A is a graph showing the carbon dioxide ($CO_2$) versus nitrogen ($N_2$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 0.04% (or 400 ppm) with $N_2$ as the balance. Selectivity at 1 bar is considered relevant to ambient direct air capture (DAC) conditions.

FIG. 8B is a graph showing the carbon dioxide ($CO_2$) versus nitrogen ($N_2$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 1% with $N_2$ as the balance (a gas composition relevant to ambient room conditions).

Figure 8D:
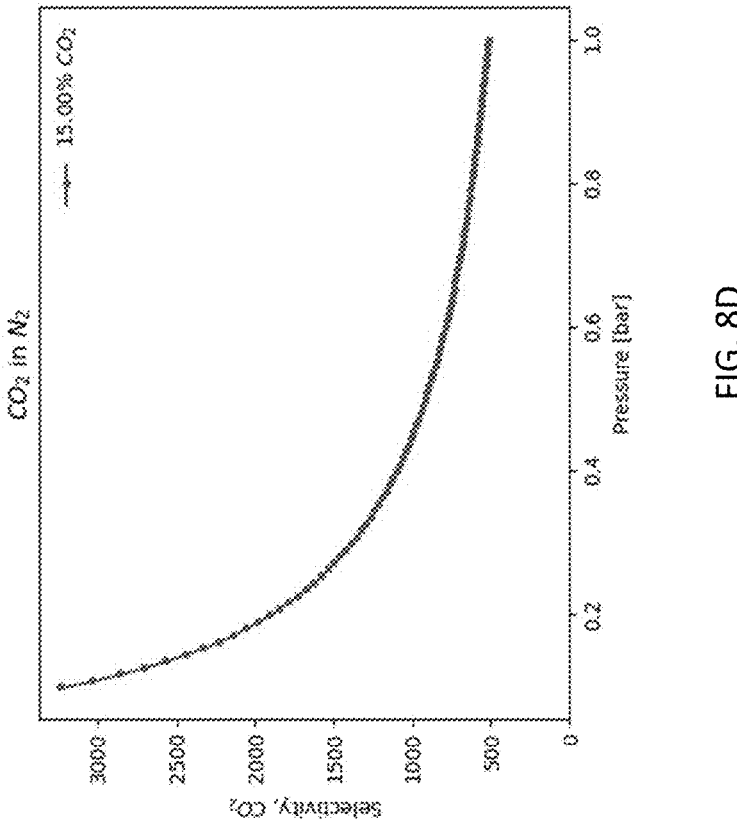
Figure 8C:
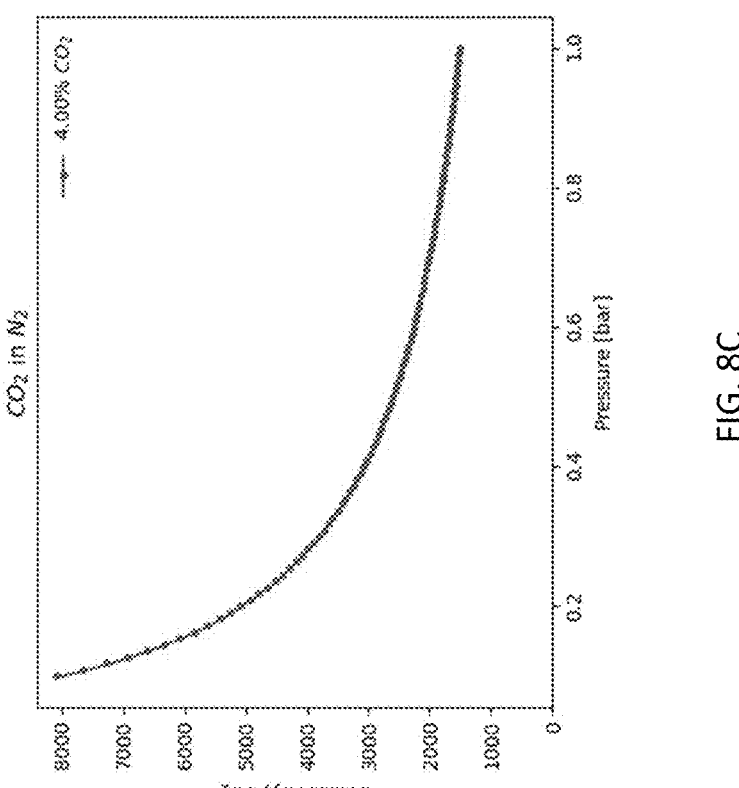

FIG. 8C is a graph showing the carbon dioxide ($CO_2$) versus nitrogen ($N_2$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 4% with $N_2$ as the balance (a gas composition relevant to natural gas combined cycle (NGCC) conditions).

FIG. 8D is a graph showing the carbon dioxide ($CO_2$) versus nitrogen ($N_2$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 15% with $N_2$ as the balance (a gas composition relevant to typical flue gas conditions).

Figures 9A, 9B:
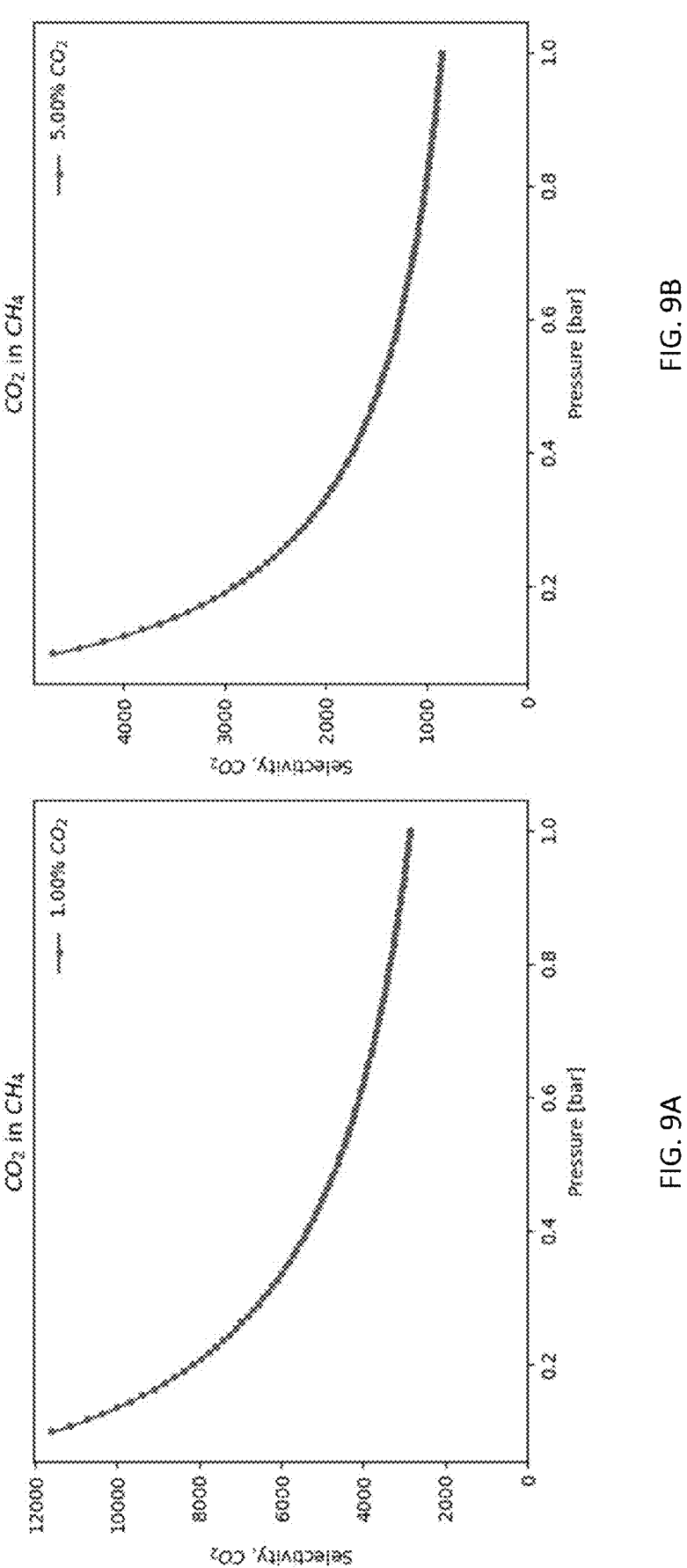

FIG. 9A is a graph showing the carbon dioxide ($CO_2$) versus methane ($CH_4$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 1% with $CH_4$ as the balance (a gas composition relevant to natural gas processing).

FIG. 9B is a graph showing the carbon dioxide ($CO_2$) versus methane ($CH_4$) selectivity of an exemplary nickel-tungsten physisorbent of the presently disclosed subject matter ($WO_2F_4$-1-Ni) as a function of pressure (in bar) at 298 Kelvin (K) in a gas having a concentration of $CO_2$ of 5% with $CH_4$ as the balance (a gas composition relevant to natural gas processing).

Figure 9C:
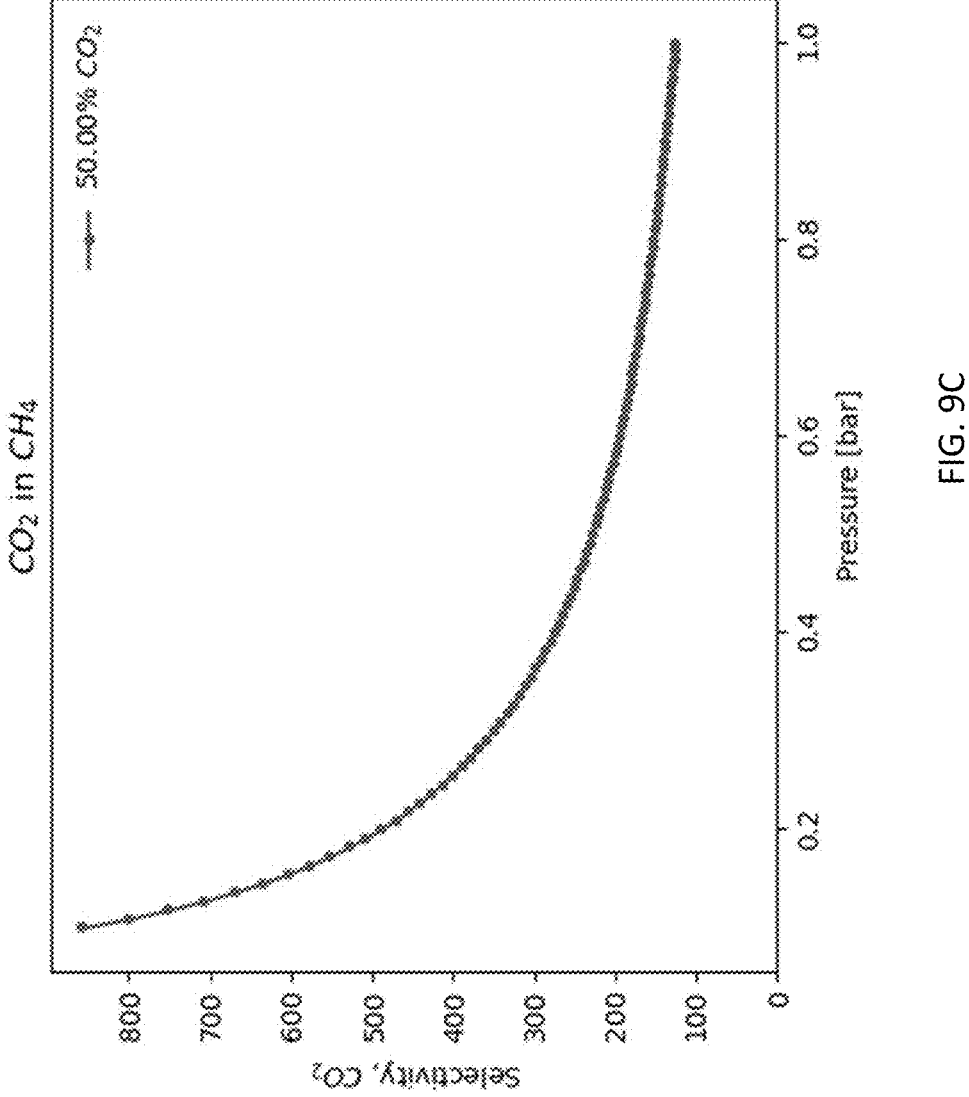

FIG. 9C is a graph showing the carbon dioxide ($CO_2$) versus methane ($CH_4$) selectivity of an exemplary nickel-tungsten physisorbent of the presently disclosed subject matter (i.e., $WO_2F_4$-1-Ni) as a function of pressure (in bar) at 298 Kelvin (K) in a gas having a concentration of $CO_2$ of 50% with $CH_4$ as the balance (a gas composition relevant to natural gas processing).

DETAILED DESCRIPTION

The presently disclosed subject matter will now be described more fully hereinafter with reference to the accompanying Figures and Examples, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist, unless as otherwise specifically indicated.

I. Definitions

Following long-standing patent law convention, the terms "a", "an", and "the" refer to "one or more" when used in this application, including the claims. Thus, for example, reference to "a solvent" includes mixtures of one or more solvents, two or more solvents, and the like.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the presently disclosed subject matter.

The term "about", as used herein when referring to a measurable value such as an amount of weight, molar equivalents, time, temperature, etc. is meant to encompass in one example variations of ±20% or ±10%, in another example ±5%, in another example ±1%, and in yet another example ±0.1% from the specified amount, as such variations are appropriate to perform the disclosed methods.

The term "and/or" when used to describe two or more activities, conditions, or outcomes refers to situations wherein both of the listed conditions are included or wherein only one of the two listed conditions are included.

The term "comprising", which is synonymous with "including," "containing," or "characterized by" is inclusive or open-ended and does not exclude additional, unrecited elements or method steps. "Comprising" is a term of art used in claim language, which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "fluid" refers to a gas, a liquid or a combination thereof. The gas or liquid can include one or more chemical components. For example, a fluid can comprise a gas stream comprising $H_2O$, $CO_2$, $O_2$, $CH_4$, $N_2$, $H_2$, and the like, and combinations thereof.

The terms "bonding" or "bonded" and variations thereof can refer to either covalent or non-covalent bonding. In some cases, the term "bonding" refers to bonding via a coordinate bond. The term "conjugation" can refer to a bonding process, as well, such as the formation of a covalent linkage or a coordinate bond.

As used herein, the term "metal-organic framework" or "MOF" refers to a porous solid-state network comprising both metal and organic components, wherein the organic components include at least one, and typically more than one carbon atom. In some embodiments, the MOF comprises metal cations linked by organic ligands and pillared by inorganic anions.

A "coordination complex" is a compound in which there is a coordination bond between a metal ion and an electron pair donor, ligand or chelating group. Thus, ligands or chelating groups are generally electron pair donors, molecules or molecular ions having unshared electron pairs available for donation to a metal ion.

The term "coordination bond" refers to an interaction between an electron pair donor and a coordination site on a metal ion resulting in an attractive force between the electron pair donor and the metal ion. The use of this term is not intended to be limiting, in so much as certain coordinate bonds also can be classified as having more or less covalent character (if not entirely covalent character) depending on the characteristics of the metal ion and the electron pair donor.

As used herein, the term "ligand" refers generally to a species, such as a molecule or ion, which interacts, e.g., binds, in some way with another species. More particularly, as used herein, a "ligand" can refer to a molecule or ion that binds a metal ion in solution to form a "coordination complex." See Martell, A. E., and Hancock, R. D., *Metal Complexes in Aqueous Solutions*, Plenum: New York (1996), which is incorporated herein by reference in its entirety. The terms "ligand" and "chelating group" can be used interchangeably.

The term "coordination site" when used herein with regard to a ligand, e.g., a bridging ligand, refers to an unshared electron pair, a negative charge, or atoms or functional groups capable of forming an unshared electron pair or negative charge (e.g., via deprotonation under or at a particular pH).

Standard temperature and pressure (STP) as used herein refers to a temperature of 25° C. and 1 atmosphere pressure.

"Heterocyclic", "heterocycle", or "heterocyclo" as used herein alone or as part of another group, refers to an aliphatic (e.g., fully or partially saturated heterocyclo) or aromatic (e.g., heteroaryl) monocyclic- or a bicyclic-ring system comprising one or more heteroatoms (e.g., 1, 2, or 3 heteroatoms selected from oxygen, sulfur, and substituted or unsubstituted nitrogen) inserted along the cyclic alkyl or aryl carbon chain. Monocyclic ring systems are exemplified by any 5- or 6-membered ring containing 1, 2, 3, or 4 heteroatoms independently selected from oxygen, nitrogen and sulfur. The 5 membered ring has from 0-2 double bonds and the 6 membered ring has from 0-3 double bonds. Representative examples of monocyclic ring systems include, but are not limited to, ethylene oxide, azetidine, azepine, aziridine, diazepine, 1,3-dioxolane, dioxane, dithiane, furan, imidazole, imidazoline, imidazolidine, isothiazole, isothiazoline, isothiazolidine, isoxazole, isoxazoline, isoxazolidine, morpholine, oxadiazole, oxadiazoline, oxadiazolidine, oxazole, oxazoline, oxazolidine, piperazine, piperidine, pyran, pyrazine, pyrazole, pyrazoline, pyrazolidine, pyridine, pyrimidine, pyridazine, pyrrole, pyrroline, pyrrolidine, tetrahydrofuran, tetrahydropyran, tetrahydrothiophene (also known as thiolane), tetrazine, tetrazole, thiadiazole, thiadiazoline, thiadiazolidine, thiazole, thiazoline, thiazolidine, thiophene, thiomorpholine, thiomorpholine sulfone, thiopyran, triazine, triazole, trithiane, and the like. Bicyclic ring systems are exemplified by any of the above monocyclic ring systems fused to an aryl group as defined herein, a cycloalkyl group as defined herein, or another monocyclic ring system as defined herein. Representative examples of bicyclic ring systems include but are not limited to, for example, benzimidazole, benzothiazole, benzothiadiazole, benzothiophene, benzoxadiazole, benzoxazole, benzofuran, benzopyran, benzothiopyran, benzodioxine, 1,3-benzodioxole, carbazole, cinnoline, indazole, indole, indoline, indolizine, naphthyridine, isobenzofuran, isobenzothiophene, isoindole, isoindoline, isoquinoline, phthalazine, purine, pyranopyridine, quinoline, quinolizine, quinoxaline, quinazoline, tetrahydroisoquinoline, tetrahydroquinoline, thiopyranopyridine, and the like. These rings include quaternized derivatives thereof and can be optionally substituted with one or more alkyl and/or aryl group substituents.

"Substituted heterocyclic" as used herein refers to a heterocyclic group wherein one or more hydrogen atom is replaced by an alkyl or aryl group substitutent, such as, but not limited to, alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

II. Carbon Dioxide Sorbent

MOFs have become increasingly of interest for a number of applications, including energy-related applications, environmental applications, and in medicine. One class of MOFs are pillared MOFs, which comprise metal centers (e.g., metal cations) coordinated to organic ligands to form periodic two-dimensional arrays, such as periodic, substantially two-dimensional square grids, that are further pillared with inorganic anions to form three-dimensional networks. These materials can be used as selective sorbents due to a combination of electrostatics and small pore size (e.g., less than 7 Å) that can enhance sorbent-sorbate interactions. Subtle substitutions in the chemical composition in these materials can lead to significant changes in properties, such as enthalpy of adsorption and hydrolytic stability.

In some embodiments, the presently disclosed subject matter provides a composition comprising a porous MOF comprising nickel centers (i.e., $Ni^{2+}$ centers), organic ligands (e.g., N-donor organic ligands), and tungsten oxyfluoride anion ($WO_2F_4^{2-}$) pillars (i.e., a MOF that comprises $WO_2F_4^{2-}$ anions as pillars for arrays of nickel-organic ligand complexes). Thus, in some embodiments, the MOF can be described by the formula $\{[Ni(L)_2WO_2F_4]x(guest)\}$, where each L (which can be the same or different) is a bidentate organic ligand (i.e., an organic ligand capable of forming coordination bonds with two cations (e.g., two metal cations, such as two Ni cations)), x is a number between 0 and 10 and guest is one or more guest species, such as, a gas or solvent species, including, but not limited to, carbon dioxide ($CO_2$), water ($H_2O$), methanol (MeOH), dimethylformamide (DMF), ethanol (EtOH), N-methyl-2-pyrrolidone (NMP), pyridine, etc. In some embodiments, the presence or absence of a guest species is not expressly indicated, and the physisorbent can described more simply as having a building unit of the formula $[Ni(L)_2WO_2F_4]$, where each L is a bidentate organic ligand. Thus, the material can have the formula $[Ni(L)_2(WO_2F_4)]_n$, where n is a positive integer. In some embodiments, n is at least 5; at least 10; at least 50; at least 100; at least 1,000; at least 10,000; at least 100,000; at least 1,000,000; at least 10,000,000; or more. In some embodiments, each L is a bidentate organic ligand comprising at least two N-donor functional groups (i.e., at least two nitrogen atoms that can donate electrons for forming a coordination bond).

In some embodiments, each L comprises one or more N-containing heterocyclic group, e.g., pyridine, pyrazine, pyrimidine, triazine, imidazole, triazole, oxadiazole, thiadiazole, quinoline, isoquinoline, phenanthroline, etc. In some embodiments, each L comprises two N-containing heterocyclic groups linked together via a direct bond or via an alkylene, alkenylene, aralkylene, or arylene linker. Thus, in some embodiments, L can be a ligand such as bipyridine (e.g., 4,4'-bipyridine, 1,2-bis(4-pyridyl)ethene, 1,2-bis(4-pyridyl)ethyne, 4,4-azopyridne, dipyridyl acetylene, 4,4'-Bis (4-ethynylpyridyl)biphenyl, 1,4-Bis(4-ethynylpyridyl)benzene, Bis(pyridine-4-ylmethylene)benzene-1,4-diamine, 1,4-Bis(4-pyridyl)durene, 1,4-Bis(4-pyridyl)benzene, 1,2-bis(4-pyridylmethylene)hydrazine or 3,6-bis(4-pyridyl)-s-tetrazine). In some embodiments, each L comprises or consists of a single heterocyclic group that contains two N atoms, such as pyrazine, 2-aminopyrazine, 2-methylpyrazine or 1,4-diazabicyclo[2.2.2]octane (DABCO). In some embodiments, the MOF can comprise two or more different L.

In some embodiments, at least one L is pyrazine. In some embodiments, each L is pyrazine. Thus, in some embodiments, the MOF is $[Ni(pyrazine)_2WO_2F_4]$.

Accordingly, in one aspect, the presently disclosed subject matter provides a MOF that comprises $WO_2F_4^{2-}$ anions as pillars for arrays of nickel-pyrazine complexes. As shown in FIGS. 1A-1C, oxygen/fluoride substitutions in inorganic anions can lead to an inherently acentric anion that contains polarizable metal-oxygen double bonds, which can alter the electronegativity/nucleophilicity of the O/F atoms. For instance, FIG. 1A shows an undistorted hexafluoride metal anion ($MF_6^{2-}$). Substitution of one fluoride ligand with oxygen (i.e., in $MOF_5^{2-}$, see FIG. 1B) or two fluoride ligands with oxygen (i.e., in $MO_2F_4^{2-}$, see FIG. 1C) results in distortion of the anion polyhedron as the result of shorter M=O bonds.

In some embodiments, the presently disclosed subject matter provides a composition comprising a porous MOF comprising nickel centers (i.e., $Ni^{2+}$ centers), pyrazine ligands, and tungsten oxyfluoride anion ($WO_2F_4^{2-}$) pillars. In some embodiments, the MOF can be characterized as comprising a molecular building unit having the formula $[Ni(pyrazine)_2(WO_2F_4)]$. Thus, the material can have the formula $[Ni(pyrazine)_2(WO_2F_4)]_n$, where n is a positive integer. In some embodiments, n is at least 5; at least 10; at least 50; at least 100; at least 1,000; at least 10,000; at least 100,000; at least 1,000,000; at least 10,000,000; or more. This MOF, which is also referred to herein as $WO_2F_4$-1-Ni, can comprise nickel-pyrazine coordination complexes that form substantially two-dimensional square grid layers, where open coordination sites on the nickel atoms interact with $WO_2F_4^{2-}$ anions to provide a three-dimensional material with approximately square-shaped channels. The material has a primitive cubic (pcu) crystal structure and a pore diameter of about 5.7332 Å to about 6.3808 Å. In some embodiments, the MOF comprises a $CO_2$ capacity of about 21 $cm^3$ $g^{-1}$ at 400 ppm $CO_2$ and 273 K.

In some embodiments, the presently disclosed subject matter provides a method of removing carbon dioxide ($CO_2$) from a fluid using an MOF as described herein, e.g., $WO_2F_4$-1-Ni MOF. In some embodiments, the presently disclosed subject matter provides a method comprising: (a) providing a metal-organic framework (MOF), the MOF comprising a plurality of molecular building units having the formula $[Ni(L)_2(WO_2F_4)]$, wherein each L is a bidentate organic ligand comprising two N-donor functional groups; (b) contacting the MOF with a fluid composition comprising $CO_2$ and one or more other chemical species; and (c) selectively capturing $CO_2$ from the fluid composition. In some embodiments, the method comprises selectively capturing $CO_2$ from the fluid composition in pores in the MOF. In some embodiments, the MOF comprises a plurality of molecular building units having the formula $[Ni(pyrazine)_2(WO_2F_4)]$.

In some embodiments, the fluid is a gas. In some embodiments, the one or more other chemical species in the fluid comprise or consist of nitrogen ($N_2$), water ($H_2O$), oxygen ($O_2$) and/or methane ($CH_4$). In some embodiments, the one or more other chemical species in the fluid comprise or consist of $N_2$ and/or $CH_4$. In some embodiments, the gas comprises about 50% (by volume) $CO_2$ or less. In some embodiments, the gas comprises about 15% (by volume), about 4% (by volume) or about 1% (by volume) $CO_2$ or less. In some embodiments, the gas comprises about 1% (by volume) or less (i.e., about 10,000 ppm $CO_2$ or less). In some embodiments, the gas comprises about 0.1% (by volume) or less (i.e., about 1,000 ppm $CO_2$ or less). In some embodiments, the gas comprises air and/or comprises about 400 ppm $CO_2$. Thus, in some embodiments, the MOF can be used for DAC. Alternatively, in some embodiments, the MOF can be used to selectively capture $CO_2$ in a confined space or at a source of $CO_2$ emission. In some embodiments, the MOF can be used to selectively capture $CO_2$ from natural gas processing or other industrial gas streams (e.g., from natural gas combined cycle applications or flue gases). Accordingly, in some embodiments, the fluid composition of step (b) is a waste gas stream from natural gas processing, a NGCC application, or is another industrial waste gas.

In some embodiments, capturing the $CO_2$ (which can also be referred to herein as "sorbing" the $CO_2$) occurs selectively over one or more of $H_2O$, $N_2$, $O_2$, and $CH_4$. In some embodiments, capturing $CO_2$ occurs selectively over $N_2$ and/or $CH_4$. In some embodiments, the MOF can selectively capture $CO_2$ with a selectivity of at least 100 compared to another species in the fluid (e.g., nitrogen or methane). In some embodiments, the selectivity for $CO_2$ is about 500, about 600, about 700, about 800, about 900, about 1000, about 1250, about 1500, about 1750, about 2000, about 3000, about 4000, about 5000, about 6000, about 7000, about 8000, about 9000, about 10000, about 12500, about 15000, about 17500, about 20000, or more. (e.g., at about 1 bar and 298 K).

In some embodiments, the MOF is heated after step (c) to release the captured $CO_2$ and regenerate the MOF (i.e., to provide the MOF in a state that can capture $CO_2$, i.e., by removing previously captured $CO_2$ from the pores of the MOF). In some embodiments, the heating comprises heating the MOF to a temperature ranging from about 100° C. to about 120° C. (e.g., about 100° C., about 102° C., about 104° C., about 106° C., about 108° C., about 110° C., about 112° C., about 114° C., about 116° C., about 118° C., or about 120° C.). In some embodiments, the MOF can be reused to capture additional $CO_2$. In some embodiments, the MOF is exposed to vacuum conditions after step (c) to release the captured $CO_2$ and regenerate the MOF. Thus, in some embodiments, the MOF is regenerated after step (c) via vacuum and reused to capture additional $CO_2$. In some embodiments, the MOF is regenerated after step (c) via vacuum and heating and reused to capture additional $CO_2$.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Synthesis and Structural Characterization

To a 100 mL autoclave lined with a non-reactive polymer (sold under the tradename as TEFLON®, The Chemours Co., Wilmington, Delaware, United States of America), potassium tungstate ($K_2(WO_4)$), deionized water, hydrofluoric acid (HF), nickel nitrate hexahydrate ($Ni(NO_2)_3·6H_2O$), pyrazine, and pyridine were added in a ratio of 1:15:1.8:0.9:1.8:0.1 by mass. The autoclave was sealed and heated in a furnace at 150° C. for 15 hours and then cooled to room temperature. The solution was removed and the remaining blue to violet precipitate was washed repeatedly with methanol until the solution remained clear. The remaining solution was decanted and the resulting polycrystalline powder was dried in air at 120° C. for two hours to afford $\{[NiWO_2F_4(pyrazine)_2]\}$ (i.e., $WO_2F_4$-1-Ni).

Laboratory X-ray powder diffraction (XPRD) provided structure solution via charge-flipping in I 4/mcm ($a=b=9.91752$ Å, $c=15.71487$ Å, $R_p=6.96\%$, $wR_p=9.95\%$) and was refined with the Rietveld method. See FIG. 2. Based on the data, it appears that $Ni^{2+}$ centers are crosslinked by pyrazine ligands to afford a $[Ni(pyrazine)_2]_n$ square lattice and are pillared by polar $(WO_2F_4)^{2-}$ anions to afford a primitive cubic (pcu) network. See FIGS. 3A and 3B.

O/F positions are disordered in the X-ray structure, but Fourier transform infrared (FTIR) spectroscopy confirmed the cis geometry of the anion ($v_s(WO_2)=966$ cm$^{-1}$, $v_{as}(WO_2)=905$ cm$^{-1}$). $Ni^{2+}$ can coordinate to the most nucleophilic parts of the anion, i.e., an O and the trans-F, with equatorial atoms disordered 0.25 O and 0.75 F.

Without being bound to any one theory, batch-to-batch color variation was attributed to defects or pleochroism as previously described for related compounds. See Heier et al., 1999. As shown in FIG. 4, the FTIR spectra of the physisorbant indicated consistency across multiple gram-scale batches. Thermogravimetric (TGA) analysis, under $N_2$ flow, confirmed stability of the material beyond 300° C.

Example 2

Carbon Dioxide Sorption

The unit cell defines a cross-pore W—W distance of 9.91752 Å; disorder of equatorial W=O (1.7682 Å) and W—F (2.0920 Å) bonds implies pore aperture can vary from 5.7332 Å to 6.3808 Å. 77 K $N_2$ isotherms offered no adsorption, confirming the ultramicroporosity (<7 Å) of the presently disclosed composition.

After activation of $WO_2F_4$-1-Ni at 120° C. for 1 hour, followed by room temperature (RT) evacuation overnight, $CO_2$ adsorption isotherms were collected at 273 K, 283 K, and 298 K. See FIG. 5A. The $CO_2$ adsorption profiles exhibited a sharp increase in adsorption at low partial pressures. More particularly, the material exhibits a $CO_2$ capacity of: 39.5-40.5 cm$^3$ g$^{-1}$ at 1 bar $CO_2$ from 273 K to 298 K; 36-37.5 cm$^3$ g$^{-1}$ at 10,000 ppm $CO_2$ from 273 K to 298 K; 27-35 cm$^3$ g$^{-1}$ at 1,000 ppm $CO_2$ from 273 K to 298 K; and 20-30.5 cm$^3$ g$^{-1}$ at 400 ppm $CO_2$ from 273 K to 298 K. At 298 K, the $CO_2$ capacity at 400 ppm (DAC, about 21 cm$^3$ g$^{-1}$), 1000 ppm, and 1% (trace $CO_2$ removal, ~27 and ~36 cm$^3$ g$^{-1}$, respectively), approach the benchmarks set by isostructural sorbents, such as TIFSIX-3-Ni and NbOFFIVE-1-Ni. See Kumar et al., 2017; and Bhatt et al., 2016.

The isosteric enthalpy of adsorption ($Q_{st}$) was about 40 kJ mol$^{-1}$ at lowest experimental loading. See FIG. 5B. This $Q_{st}$ is lower than that of isostructural compounds (NbOFFIVE-1-Ni and TIFSIX-3-Ni, 50-55 kJ mol$^{-1}$). Without being bound to any one theory, it is believed that the difference in W$=$O and W$—$F bond distances and their disorder across the structure can remove the "ideal" binding site and create variations in pore size that varies from too large to too small.

However, in the context of carbon capture applications, it is not just binding strength and selectivity that are considered. Adsorption, regeneration, stability, and recyclability are factors that can be addressed. Preliminary time-resolved sorption studies of 400 ppm $CO_2$ in $N_2$ (60 sccm) revealed $WO_2F_4$-1-Ni to exhibit an uptake rate three times greater than NbOFFIVE-1-Ni. See FIG. 6A. On a volumetric basis, $WO_2F_4$-1-Ni offers comparable $CO_2$ capacity to other benchmarks (see FIG. 6B), similar regeneration times to NbOFFIVE-1-Ni (thermal swing, 10° C. min$^{-1}$ to 120° C.) and higher thermal stability.

Example 3

Carbon Dioxide Selectivities

To assess the selectivity of $WO_2F_4$-1-Ni for $CO_2$ over other competitive gases, e.g., nitrogen ($N_2$) and methane ($CH_4$), Ideal Adsorbed Solution Theory (IAST) was applied on pure gas adsorption isotherms. See Myers and Prausnitz, 1965. As shown in FIGS. 7A-7C, the pure gas isotherms were fitted with appropriate models (i.e., Henry and dual-site Langmuir (DSL)). See Iacomi and Llewellyn, 2019. IAST selectivities for $CO_2/N_2$ and $CO_2/CH_4$ were calculated against these models as a function of partial pressure and total pressure. Specific partial pressures of $CO_2$, $N_2$, and $CH_4$ were selected to represent typical $CO_2$ separation applications, e.g., DAC, ambient room conditions, natural gas combined cycle (NGCC) conditions, typical flue gas conditions and a broad range of natural gas (NG) processing conditions. See FIGS. 8A-8D and 9A-9C. Table 1, below, summarizes the IAST selectivities of $CO_2$ over other gases at relevant partial pressures.

TABLE 1

IAST Selectivity $S_{a/b}$ for a = $CO_2$.

| Process | b | $CO_2$ Concentration | $S_{a/b}$ (1 bar, 298K) |
|---|---|---|---|
| DAC | $N_2$ | 0.04% | 23711.40 |
| Room | $N_2$ | 1% | 4288.31 |
| NGCC | $N_2$ | 4% | 1510.47 |
| Flue | $N_2$ | 15% | 517.39 |
| NG Processing | $CH_4$ | 1% | 2858.93 |
| NG Processing | $CH_4$ | 5% | 845.72 |
| NG Processing | $CH_4$ | 50% | 125.85 |

Discussion of Examples

In summary, the presently disclosed subject matter provides a new inorganic anion pillar for use in an ultramicroporous physisorbent for $CO_2$ (e.g., in DAC). $WO_2F_4$-1-Ni offers new insight into the use of polarizable bonds in controlling and affecting the sorption properties in this class of material. As a percentage of 1 bar loading at 298 K, $WO_2F_4$-1-Ni was found to be already 40% loaded with $CO_2$ at 400 ppm (~21 cm$^3$ g$^{-1}$) and has the third highest $CO_2$ capacity at this partial pressure of any known physisorbent to date. The values suggest the utility of $WO_2F_4$-1-Ni for removing $CO_2$ in several applications.

REFERENCES

All references listed in the instant disclosure, including but not limited to all patents, patent applications and publications thereof, scientific journal articles, and database entries, are incorporated herein by reference in their entireties to the extent that they supplement, explain, provide a background for, and/or teach methodology, techniques, and/or compositions employed herein. The discussion of the references is intended merely to summarize the assertions made by their authors. No admission is made that any reference (or a portion of any reference) is relevant prior art. Applicants reserve the right to challenge the accuracy and pertinence of any cited reference.

Bhatt, P. M. et al., J. Am. Chem. Soc., 2016, 138, 9301-9307.
Heier, K. R. et al., Inorg. Chem. 1999, 38, 762-767.
Iacomi, P. and Llewellyn, P., Adsorption, 2019, 25, 1533-1542.
Kumar, A. et al., Chem. Commun. 2017, 53, 5946-5949.
Myers, A. L. and Prausnitz, J. M., AIChE Journal, 1965, 11(1), 121-127.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A metal-organic framework (MOF) comprising a plurality of molecular building units having the formula [Ni(L)$_2$($WO_2F_4$)], wherein each L is a bidentate organic ligand comprising two N-donor functional groups.

2. The MOF of claim 1, wherein each L comprises one or more N-containing heterocyclic groups.

3. The MOF of claim 2, wherein each L is pyrazine and the MOF comprises a plurality of molecular building units having the formula [Ni(pyrazine)$_2$($WO_2F_4$)].

4. A method of removing carbon dioxide ($CO_2$) from a fluid, the method comprising:
   (a) providing a metal-organic framework (MOF), the MOF comprising a plurality of molecular building units having the formula [Ni(L)$_2$($WO_2F_4$)], wherein each L is a bidentate organic ligand comprising two N-donor functional groups;
   (b) contacting the MOF with a fluid composition comprising $CO_2$ and one or more other chemical species; and
   (c) selectively capturing the $CO_2$ from the fluid composition.

5. The method of claim 4, wherein the MOF comprises a plurality of molecular building units having the formula [Ni(pyrazine)$_2$($WO_2F_4$)].

6. The method of claim 4, wherein the one or more other chemical species comprise nitrogen ($N_2$), water, oxygen ($O_2$), and/or methane ($CH_4$).

7. The method of claim 4, wherein the fluid is a gas comprising about 50% by volume $CO_2$ or less.

8. The method of claim 7, wherein the fluid is a gas comprising about 15% by volume $CO_2$ or less.

9. The method of claim 8, wherein the fluid is a gas comprising about 4% by volume $CO_2$ or less.

10. The method of claim 4, where the fluid is air comprising about 400 ppm $CO_2$.

11. The method of claim 4, wherein capturing the $CO_2$ occurs selectively over one or more of water, $N_2$, $O_2$, and $CH_4$.

12. The method of claim 4, wherein the MOF is regenerated after step (c) via heating and reused to capture additional $CO_2$.

13. The method of claim 4, wherein the MOF is regenerated after step (c) via vacuum and reused to capture additional $CO_2$.

14. The method of claim 4, wherein the MOF is regenerated after step (c) via vacuum and heating and reused to capture additional $CO_2$.

\* \* \* \* \*